Oct. 9, 1923.
W. CLAWSON
KNIFE
Filed Nov. 14, 1922
1,470,147
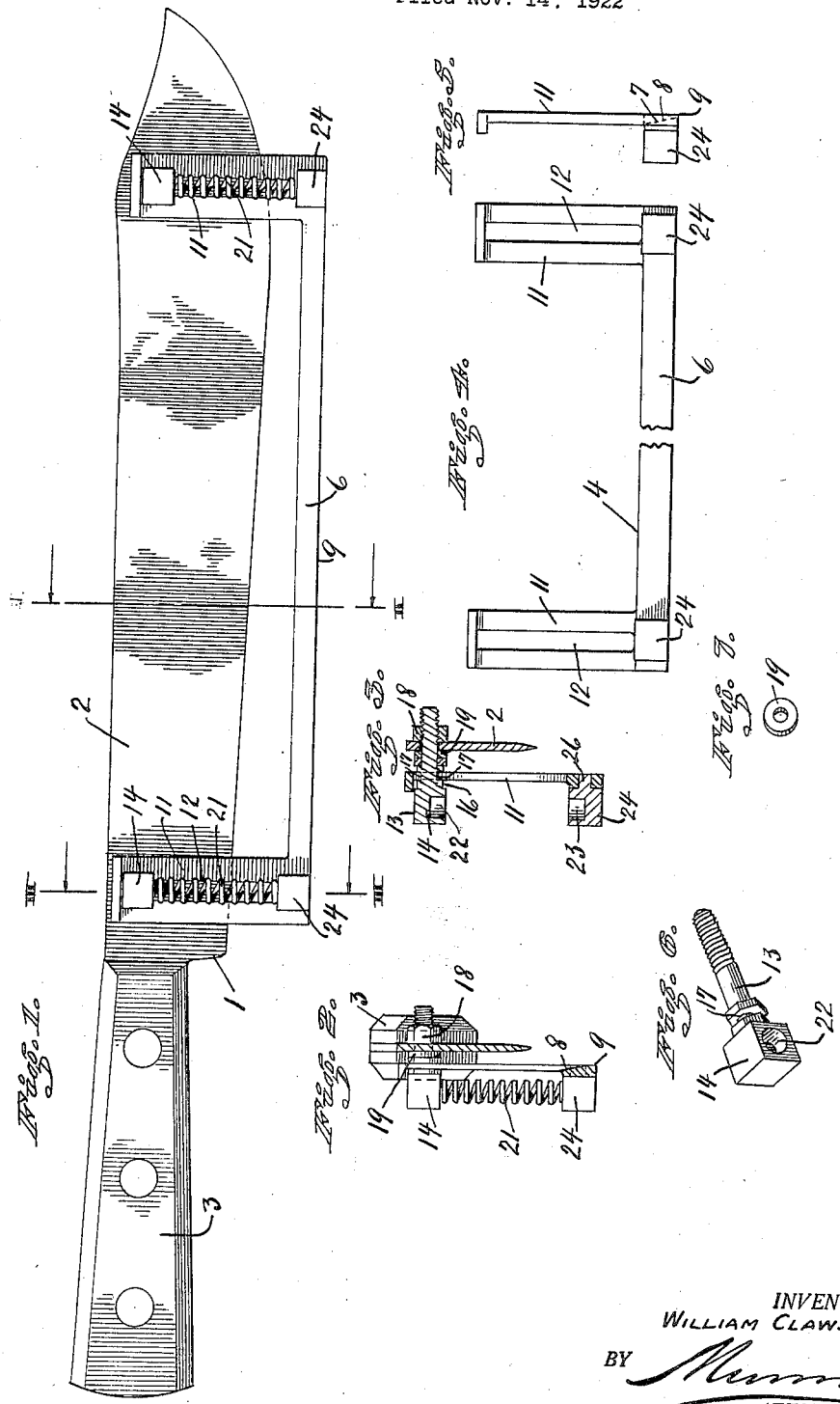
INVENTOR.
WILLIAM CLAWSON
BY 
ATTORNEYS.

Patented Oct. 9, 1923.

1,470,147

UNITED STATES PATENT OFFICE.

WILLIAM CLAWSON, OF SAN FRANCISCO, CALIFORNIA.

KNIFE.

Application filed November 14, 1922. Serial No. 600,903.

*To all whom it may concern:*

Be it known that I, WILLIAM CLAWSON, a citizen of the United States, and a resident of San Francisco, county of San Francisco, State of California, have invented a new and useful Knife, of which the following is a specification.

The present invention relates to improvements in knives and has particular reference to a knife used for slicing bread or similar objects, the principal idea being to provide guide means in combination with the knife allowing a slice or a plurality of slices to be cut at a uniform thickness. It is proposed to utilize for this purpose a guide member supported in spaced and parallel relation to the knife blade with its guiding edge normally projecting beyond and leading the cutting edge of the blade and adapted to be forced backwardly when meeting with a resistance, as for instance the table on which the bread to be sliced lies, at the end of the cut. It is further proposed to construct the guide member in such a way as to allow the cut slices to pass between the guide member and the blade and to fall away from the latter during the cutting operation. Further objects of my invention will appear as the specification proceeds.

With these objects in view I have illustrated the preferred form of my invention in the accompanying drawing in which Figure 1 shows a side view of my knife with the guide attached thereto, Figure 2 a vertical cross section along line II—II of Figure 1, Figure 3 a vertical cross section along line III—III, Figure 4 a detail view in side elevation of the guide member, Figure 5 an end view of the latter, Figure 6 a perspective detail view of a support for the guide member and Figure 7 a perspective detail view of one of a plurality of washers adapted to be used as spacing members. While I have shown only the preferred form of the invention it should be understood that various changes or modifications may be made within the scope of the claim hereto attached without departing from the spirit of the invention.

The knife (1) is made of any suitable shape and comprises the blade (2) and the handle (3). The guide (4) shown in detail in Figures 4 and 5 includes a guiding member (6) slightly shorter in length than the knife blade and made comparatively thin so as to take up little room. It is substantially triangular in cross section as shown at (7) throughout its operative portion, its face (8) slanting away from its cutting edge (9) so as to allow a slice of bread or the like to fall away from the main body after it has been cut. At either end the guide member (6) is provided with an arm (11) having a slot (12) thereon which latter is adapted to be slidably engaged by a support (13) extending from one face of the blade at either end. One of the supporting members (13) is shown in detail in Figure 6 and in other views and comprises a bolt provided with a preferably square head (14) and a collar (16) rigidly secured thereto having two parallel grooves (17) therein adapted to slidably engage the slots in the arms (11). The bolts are secured to the blade by means of the nuts (18) and washers (19) of any suitable size and any suitable number may be interposed between the collar (16) and the blade for adjusting the distance between the latter and the guide whereby the thickness of the slice to be cut is determined.

To hold the guide member normally in a leading position relative to the blade I employ the springs (21) supported at one end in a socket (22) of the square head (14) of the supporting member (13) and at the other end in a corresponding socket (23) of a square block (24) secured by means of a projection (26) at the base of each arm (11).

It will be seen from the foregoing description that normally the guide member (6) is held in spaced and parallel relation to the blade of the knife with its guiding edge (9) projecting beyond and leading the cutting edge of the blade due to the action of the springs (21). To cut a slice the guiding edge is placed against the face of the object from which the slice is to be cut, as a loaf of bread for instance, and the cutting edge of the blade on the top of the same, the thickness of the slice to be cut being determined by the number and size of washers (19) interposed between the guide and the blade. The latter is then pressed downwardly and the guide member and blade will maintain their relative position until the guide member reaches the support for the loaf of bread as the table for instance. The guide member then yields to further pressure on the blade no matter at which point it strikes the table first and does not interfere with the further operation. In fact it tends to assist in the finishing part of the operation by offering yielding resistance to the pressure applied. The particular shape of the guiding member with its face slanting away from the guiding edge allows the slice of bread to fall away from the loaf during the cutting operation.

I claim:

In a knife, a blade, a guide member having two arms extending therefrom, two supports extending from one face of the blade engaging slots in the arms for supporting the guide member in spaced and parallel relation to the blade and spring means associated with each arm for normally forcing the guiding member into a leading position relative to the cutting edge of the blade adapted to yield when a resistance is met by the guide member, said guide member including a guiding edge and a guiding face slanting away from the edge allowing a cut slice to fall away from the main body.

WILLIAM CLAWSON.